May 13, 1952  E. E. WALLACE  2,596,350
HYDRAULIC VALVE OPERATING SYSTEM
FOR INTERNAL-COMBUSTION ENGINES
Filed Sept. 3, 1947  2 SHEETS—SHEET 1
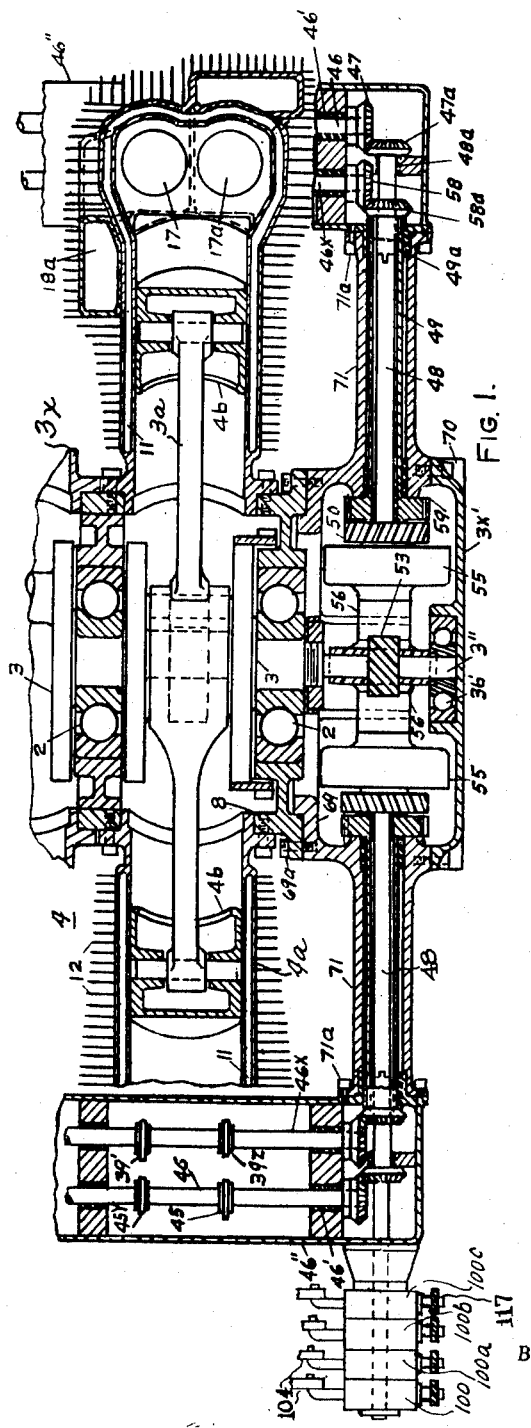
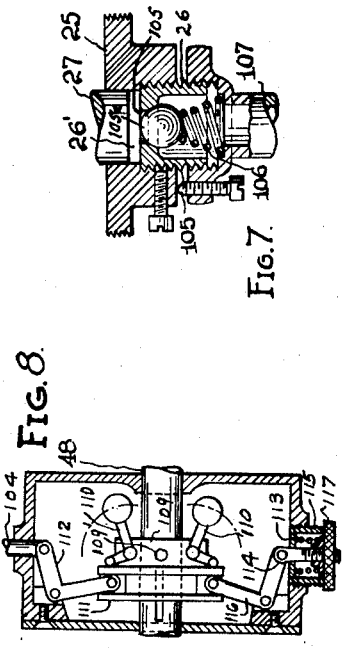
Edward E. Wallace
INVENTOR.
BY Geo. B. Pitts
Attorney

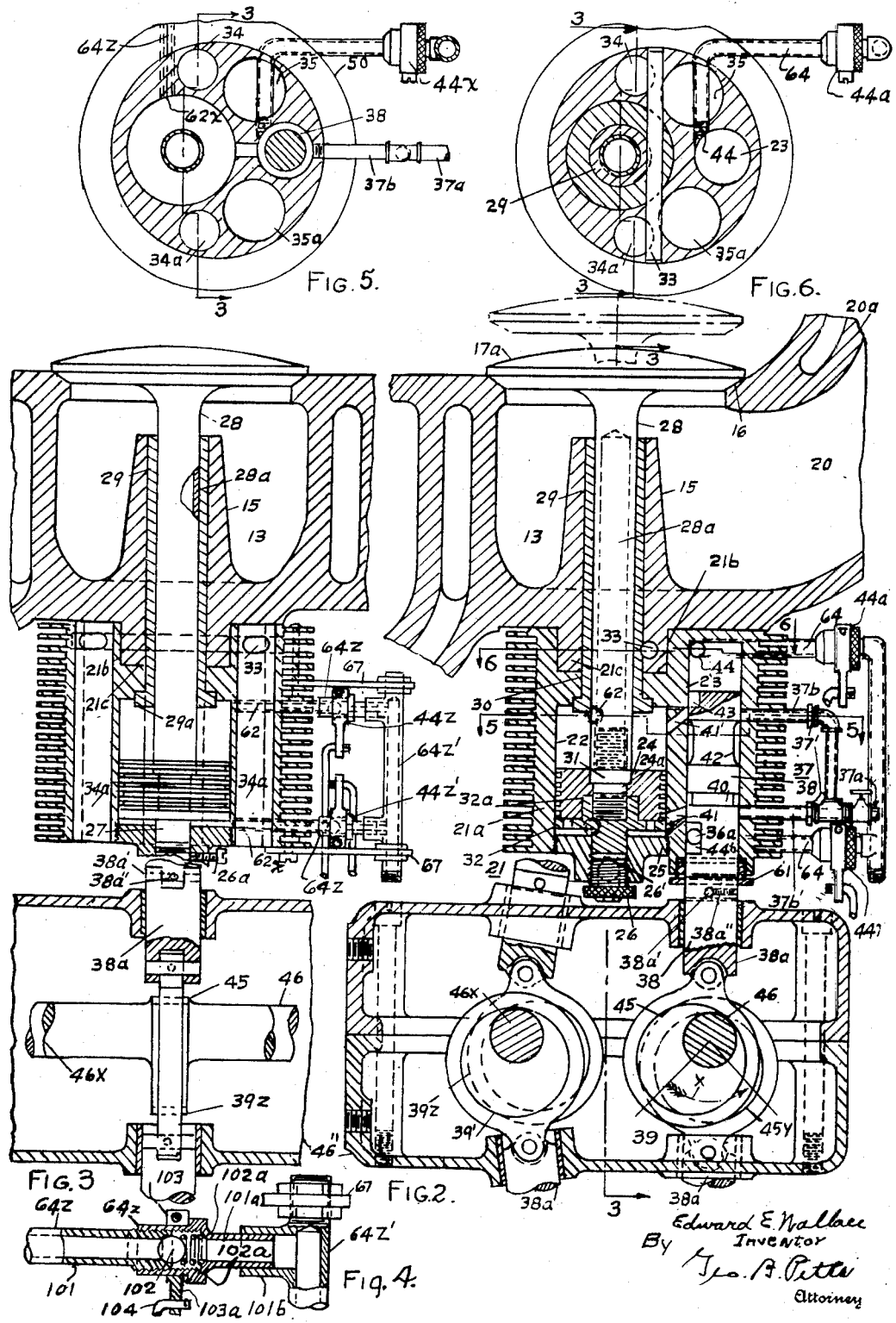

Patented May 13, 1952

2,596,350

UNITED STATES PATENT OFFICE 2,596,350

HYDRAULIC VALVE OPERATING SYSTEM FOR INTERNAL-COMBUSTION ENGINES

Edward E. Wallace, Cleveland Heights, Ohio; Daisy T. Wallace, administratrix of said Edward E. Wallace, deceased Application September 3, 1947, Serial No. 771,954

4 Claims. (Cl. 123—90)

This invention relates to an internal combustion engine. While the engine may be utilized for various purposes, I have in mind more particularly an engine of this type constructed for mounting inside of the wing airfoil of an airplane and operable to drive its propeller.

In internal combustion engines it is customary, according to my knowledge, to operate the inlet and exhaust valves in one direction by means of cams on a cam shaft and provide springs for seating the valves, the effect of which is to set up vibrations in the engine. As the speed of the engine crank shaft is accelerated these vibrations increase with various periods of interference which must be compensated for by torsion and centrifugal forces. These conditions are magnified to a high degree in high speed engines by reason of the weight of the valves due to their increase in size, thereby necessitating the use of larger and stronger seating springs. Furthermore, in the use of seating springs, the height or opening movement of the valves is limited and the closing movement is dependent upon the effectiveness of the springs. Accordingly, the vibrations resulting from the rapid reciprocations of the valves present a serious problem. In my form of construction I eliminate the use of all seating springs and also the cams for operating the valves in one direction and provide a form of construction wherein the operation of the inlet and exhaust valves may be (a) opened to a greater extent and operated quicker between closing and open positions in both directions, thereby increasing the efficiency of the engine and (b) controlled to prevent hammering in reaching the end of their movement in either direction, so that these vibrations are materially reduced, while permitting the speed of the engine crank shaft to be accelerated to the full capacity of the engine. This construction therefore may be advantageously co-ordinated with other factors in designing and constructing an engine having equal or higher horsepower than those at present in use.

Also, as later set forth, I operate and control the operation of each valve by means of a non-compressible medium, such as oil, so that the speed of the engine may be accelerated or decelerated rapidly through relatively wide ranges while insuring the operation of the valve devoid of hammering or vibration effects.

One object of the invention is to provide, in an internal combustion engine, improved means for positively operating either or both valves of the engine, whereby the use of a seating spring or springs is eliminated.

Another object of the invention is to provide, in an internal combustion engine having an inlet valve and an exhaust valve, improved means for operating each valve with a quick opening and closing movement and for effecting a dwell of the valve in substantially full open position.

Another object of the invention is to provide for each valve, in an internal combustion engine, improved hydraulically operating means, having a control device therefor operated by a driven element of the engine, whereby the valve is operated in co-ordinated relation to each engine cycle but independently of said driven element, to effect a quick opening and a quick closing of the valve.

Another object of the invention is to provide improved mechanism for the inlet and exhaust valves of an internal combustion engine, each said mechanism including means for opening and closing the valve and a control device for said means actuated by an element which is drivingly connected to the engine shaft.

Another object of the invention is to provide an improved operating mechanism for the valve of an internal combustion engine arranged to maintain the valve when unseated, in substantially full open position for a predetermined period in each cycle of operation of the engine.

Another object of the invention is to provide in an internal combustion engine an improved hydraulically operated valve mechanism having incorporated therein automatically actuated means for controlling the movement of the valve as it approaches the end of its movement in either direction.

Other objects of the invention will be apparent to those skilled in the art to which my invention relates from the following description taken in connection with the accompanying drawings, wherein Fig. 1 is a fragmentary section of an internal combustion engine having inlet and exhaust valves each having an operating mechanism embodying my invention.

Fig. 2 is a fragmentary section through the exhaust valve and its operating mechanism.

Fig. 3 is a section on the line 3—3 of Figs. 2, 5 and 6.

Fig. 4 is a fragmentary section of parts shown in Fig. 3.

Figs. 5 and 6 are sections on the lines 5—5 and 6—6, respectively, of Fig. 2.

Figs. 7 and 8 are fragmentary sectional views showing certain details.

In the drawings, 1 indicates as an entirety a crank case having at its opposite ends suitable anti-friction bearings 2 which support a crank shaft 3 for an internal combustion engine, indicated as an entirety at 4. The engine 4 consists of a plurality of cylinders 4a, two only being shown disposed radially of the axis of the shaft 3. At one end, the crank case is closed by a removable cap 3x (see Fig. 1) and at its opposite end the crank case is closed by a removable housing 3x' (see Fig. 1), to which reference will later be made. The piston 4b is mounted in each cylinder and connected by a pitman to the crank shaft 3, as shown at 3a. The crank shaft 3, at the end which is closed by the cap 3x, is extended through and beyond the cap and provided on its outer end portion with splines to form a connection for a device (not shown) to be driven.

The wall of the crank case 1 is formed with openings 8 each in connected relation to the inner end of one of the cylinders 4a. The wall of each opening 8 and the inner end of the adjacent cylinder 4a are shaped to provide a removable connection between them, whereby each cylinder 4a may be detached and removed from the crank case 1 independently of each of the adjacent cylinders. Each cylinder is provided with a jacket for a cooling medium. The jacketed wall of each cylinder, at its outer end, is extended to form a firing chamber 13, one wall of which is shaped to provide inwardly extending, integral bosses 15 (one only being shown), each formed with a through opening, and seats 16, inwardly of the bosses, in side by side relation, for valves 17, 17a (one—for example, valve 17—serving as the inlet valve and the other serving as the exhaust valve). Also, the side walls of each cylinder are connected to conduits, one being shown at 18a, for the supply of vaporized fuel and discharge of the gases of combustion.

Each of the valves 17, 17a, is operated by a hydraulically operated mechanism indicated as an entirety at 21. Liquid—such as oil—is employed for the reason that it is substantially non-compressible and therefore insures a positive stroke to the piston, in either direction of movement thereof, and permits control of the piston as it approaches its fully open and fully closed positions, to reduce vibrations and hammering, these advantages being of vital importance in high speed engines such as employed in airplanes. The valves 17a for the adjacent upper and lower cylinders at each side of the crank case 1 are controlled by a shaft 46 and the valves 17 for the adjacent upper and lower cylinders at each side of the crank case 1 are controlled by a shaft 46x, these shafts being driven at one-half the speed of the crank shaft to co-ordinate the operations of the valves with the engine cycle. As these mechanisms are similar in construction, the description and illustration of one thereof will suffice for each of the remaining valve operating mechanisms. Referring to Figs. 1, 7, 8, 9 and 10, which illustrate the operating mechanism 21 for the exhaust valve 17a, for one of the cylinders 4a, 21a indicates a casing or housing having bores 22, 23, extending inwardly from its lower end, the bore 22 forming a cylinder for a piston 24. The cylinder 22 is closed at its outer end by a removable head or end wall 25, preferably having screw threaded engagement with the inner wall of the cylinder, and forming the lower end thereof. The wall 25 is formed with a through opening, axially related to the cylinder and internally threaded to receive a removable externally threaded member 26, whereby its inner end may be adjusted relative to the inner end of the opening to form a recess 26' into which an extension or boss 27 on the outer end of the piston 24 projects in the down stroke of the piston 24. The member 26 serves as a support for a valve controlled back pressure means for the boss 27 to cushion the piston at the end of its stroke. As shown in Fig. 7, the bottom wall of the member 26 is formed with an opening 105, in communication with the recess 26'.

The wall of the opening, on the inner side of the bottom wall, forms a seat for a ball valve 105a, normally held in engagement therewith by a spring 106. 107 indicates a nipple, suitably connected to a pipe (not shown) leading to a sump. The upper end of the nipple 107 is enlarged and provided internally with screw threads, whereby it may be adjustably mounted on the outer end portion of the member 26 to adjust the tension of the spring 106. The inner wall of the nipple 107, within the enlarged portion thereof, provides a seat for the spring 106. This assembly operates as a dashpot to relieve excess pressure in the recess 26', due to discharge of oil in opposition to the spring operated valve, as the boss 27 projects into the recess 26'. Accordingly, it will be seen that the recess, the valve therefor and projection 27 operates as a dashpot for the piston 24, when the latter is moving in the direction to effect seating of the adjacent valve, thereby serving to cushion the valve 17a as it engages its seat 16 and prevent hammering or impact. The member 26 may be locked in adjusted position by a set screw 26a, whereas the nipple 107 may be locked to the wall 25 by a set screw 108. The valve 17a is provided with a shank 28 which slidably fits a bushing 29 mounted in the adjacent boss 15. The bushing 29 extends through an opening 30 formed in the inner end wall of the cylinder 22 and is provided at its lower end with a circumferential flange or collar 29a which is seated in a recess surrounding the opening 30. The thickness of the flange or collar 29a is greater than the depth of the recess, so that the outer face of the collar forms a stop for the piston 24 when moving in valve-unseating direction, whereby a space is provided between the piston and inner end wall of the cylinder 22 for a purpose that will later be apparent. The valve shank 28 is formed with an opening or recess 28a extending from its free end inwardly to a point adjacent the valve. The recess 28a is adapted to be filled with a suitable material, such as sodium or a bar of aluminum to conduct heat away from the valve. The recess 28a is closed by a removable pin 31, the inner end of which has screw threaded engagement with the walls of the recess. The pin 31 serves to connect the shank 28 to the piston 24. In the arrangement shown, the projection 27 is formed integrally with a plate 32 which approximates the diameter of the piston 24. On its inner side, the plate 32 is formed with an annular boss 32a, threaded internally to receive the reduced outer screw threaded end of the pin 31, which extends through an opening 24a formed in the piston 24. As shown, the opening 24a is enlarged at its inner end to form a seat for the shoulder formed by the reduced end of the pin 31, so that by turning the flange or plate 32 on the pin 31, the flange or plate 32 and piston 24 will be rigidly secured together for reciprocation as a unit in opening and closing the valve 17a. The upper end of the casing 21a is formed with an annular recess 21b which is concentric to the opening 30 and forms a seat for an integral pilot 21c depending from the bottom wall of the firing chamber 13, and fitting into the recess 21b, thereby serving to aline the opening 30 with the opening through the boss 15. A removable pin 33 operates to engage and detachably secure the bushing 29 in position and the bushing in turn, through the engagement of its flange 29a with the inner wall of the cylinder 22, serves to removably hold the casing 21a against the adjacent wall of the firing chamber 13.

The casing 21a is formed with auxiliary bores 34, 34a, 35, 35a, open at their lower ends. These bores serve to eliminate metal to reduce weight, but being filled with air, they also serve to cool the walls of the cylinders 22 and 23.

37 indicates as an entirety a mechanism for controlling the supply of a liquid under pressure to the cylinder 22 and the discharge or exhaust of the liquid therefrom to effect the reciprocation of the piston 24 therein. Of the mechanism 37, 38 indicates a device or valve element reciprocatable in the bore or cylinder 23 by a driven mechanism indicated as an entirety at 39.

The liquid, which is preferably oil under pressure, is supplied from a suitable source through a pipe 37a. The pipe 37a is connected to inlet pipes or nozzles 37b, 37b', which are connected to the bore or cylinder 23 at spaced points, whereby the device 38 controls (a) the supply of the liquid alternately from the pipes 37b, 37b', into the cylinder 22 at opposite sides of the piston 24 and (b) the exhaust of the liquid from the cylinder, such supply and exhaust serving to reciprocate the piston 24. To provide for this operation of the piston 24, the control device 38 is provided with the following: (a) a conduit 40, which in the down position of the device registers with the discharge end of the pipe 37b' and outer and inner ports 41, extending through the wall of the casing 21a from the cylinder 23 to the lower end of the cylinder 22, but in the up position of the device 38 the wall thereof cuts off the liquid supply from the pipe 37b'; (b) an elongated conduit 42 which in the up position of the device 38 registers with the discharge end of the pipe 37b and outer and inner ports 41', extending through the wall of the casing 21a from the cylinder 23 to a point adjacent the upper end of the cylinder 22, but in the down position of the device 38 the wall thereof cuts off the liquid supply from the pipe 37b; (c) a recess 43 formed in the side wall of the device or plunger 38 at its upper end and arranged to register with the ports 41', when the plunger 38 is moved to its down position, whereby the liquid in the cylinder above the piston 24 is exhausted, during the upstroke thereof, the discharged liquid flowing into the upper end of the cylinder 23 and escaping through the port connected to an automatically controlled, spring operated pressure relief valve means indicated as an entirety at 44; and (d) a recess 44a formed in the side wall of the plunger 38 below the conduit 40 and arranged to register with the ports 41, and duct 36a when the plunger is moved to its up position, the duct 36a being connected to an automatically controlled, spring operated pressure relief valve means indicated as an entirety at 44x, whereby liquid in the cylinder 22 below the piston is exhausted during the downstroke thereof.

As later pointed out, in the up-stroke of piston 24, inner port 41' is cut off thereby in advance of the piston reaching the end of its stroke, so that upon reversal of movement of the device 38, an initial supply of liquid under pressure flows through port 41' to impart downward movement to the piston 24; likewise, in the down-stroke of piston 24, inner port 41 is cut off thereby in advance of the piston reaching the end of its stroke, so that upon reversal of movement of the device 38, an initial supply of liquid flows through port 41 to impart upward movement to the piston 24.

The conduits 40 and 42 preferably consist of annular recesses formed in the outer wall of the device 38. The device 38 is reciprocated up and down (as viewed in Fig. 2) in coordinated relation to the engine cycle of the adjacent cylinder by an eccentric 45 fixed to the shaft 46, which extends parallel to the crank shaft 3. It will be understood that a similar construction and arrangement, deriving power from a shaft 46x for each of the inlet valves 17 are provided. It will be noted (a) that the conduits 40 and 42, through which the liquid flows to the opposite sides of the piston 24, are so related to the exhaust recesses 43 and 44a, respectively, that when either conduit moves into registry with the adjacent supply pipe and port to operate the piston in one direction, its related exhaust recess moves into registry with the port adjacent thereto, whereby the liquid in the cylinder on the opposite side of the piston may be exhausted, so that the piston is free to move under the pressure of the liquid so admitted to the cylinder 22; and (b) that when the liquid is admitted to either end of the cylinder 22 the piston 24 is impelled with a quick motion toward the opposite end of the cylinder, independently of the rate of movement of the device 38. As the shafts 46 and 46x rotate at one-half the speed of the crank shaft 3, the reciprocation of the devices 38, through the pistons 24, controls the unseating and seating of the valves 17, 17a, in co-ordinate relation to the engine cycle of the adjacent cylinder. By preference, the conduit 42 provided in each device 38 has a length longitudinally of the device 38 of approximately three times the width of the adjacent conduit 40, which ratio provides for the movement of the adjacent valve in unseating direction through a 90 degree angle (represented by arrow $x$) in each revolution of the adjacent shaft and movement of the valve in the opposite direction and in seating position through a 270 degree angle in each revolution of the adjacent shaft, and these conduits are so arranged that each admits liquid to the cylinder 22 immediately following the disconnection of the other conduit from the adjacent port.

It will also be noted that as soon as the liquid is admitted to the lower end of the cylinder 22, the valve is operated to full open position and remains in the latter position during movement of the eccentric through the 90 degree angle $x$ or until the port 41 is closed and port 41' is connected with the conduit 42; and as soon as liquid is admitted through the port 41', the valve is moved to its closed position and remains in the latter position during movement of the eccentric through the 270 degree angle.

It is also to be noted that since each conduit 40, 42, is moved into registry with the adjacent ports there is a liquid flow from substantial zero to maximum, so that the piston is gradually started and accelerated in its movement in each direction and as later pointed out, it is cushioned at the end of each movement. The shafts 46 and shafts 46x are preferably driven as follows: the shaft 46 at that end adjacent to the housing 3x' is provided with a bevel gear 47 in mesh with a bevel gear 47a, which is fixed to the outer section of a sectional shaft 48. The outer shaft section is removably connected end to end to the inner section of the shaft 48, which inner section extends through a sleeve shaft 49 (later referred to) and carries at its inner end a gear 50, whereas the inner end of the shaft 48 is provided with a gear 50a, the gears 50, 50a, being drivingly connected through gear trains with a worm pinion 53 on the extension 3" of the shaft 3. The shaft 46 is mounted in bearings 46' within a housing 46 and the eccentric 45 is pivotally connected to the lower end of a connector 38a, the upper end of which is detachably connected to the lower end of the device 38 (preferably by means of a pin 38a' extending through overlapping portions on the adjacent ends of the connector 38a and device 38). The connector 38a slides in a bushing mounted in and extending through the adjacent wall of the housing 46''. The pivotal connection between the connector 38a and eccentric 45 permits the latter to swing laterally during rotation of the shaft 46, to operate the device 38 and connector 38a endwise.

The eccentric 39' for operating the control device 38 for each of the inlet valves 17 is fixed to a shaft 46x, which is mounted in the housing 46'' similarly to the shaft 46 and is provided with a bevel gear 58 in mesh with a bevel gear 58a fixed to the outer end of the sectional sleeve shaft 49.

The outer section of each shaft 46 is mounted in a bearing 48a suitably supported in the housing 46'' and its inner end is provided with diametrically related lugs fitting complementary recesses in the outer end of the adjacent inner shaft section to removably and drivingly connect the sections together. The outer section of each sleeve shaft 49 is mounted in a bearing 49a mounted in a collar projecting laterally from the inner wall of the housing 46'' and its inner end is provided with lugs which fit complementary recesses formed in the outer end of the adjacent inner shaft section, to removably and drivingly connect the shaft sections together.

As shown in Fig. 2, the shaft 46 is provided with a separate eccentric 45Y which is pivotally connected to and operates the exhaust valve mechanism for the adjacent lower cylinder 4a and that the shaft 46x is provided with a separate eccentric 39Z which is pivotally connected to and operates the inlet valve mechanism for the adjacent lower cylinder.

The lower end of the cylinder 23 is provided with a suitable gland 61 to prevent leakage of the liquid therefrom during operation of the control device 38.

The purpose of the spring operated pressure relief valve means 44a, 44x, is to establish a back pressure on the reciprocating piston 24 as it approaches the end of its movement in either direction; that is, the valve means 44a is effective prior to the closing off of the port 41' in the upward movement of the piston 24 and the valve means 44x is effective prior to the closing off of the port 41 in the downward movement of the piston 24. Thus, it will be seen that I provide high pressure on one side of the piston 24 in each stroke thereof and a low pressure on the opposite side thereof, the low pressure being automatically controlled in coordinated relation to the speed of the engine, as later set forth.

44z, 44z', indicate automatically controlled, spring operated pressure relief valve means connected to the opposite ends of the cylinder 22 to cushion the impact of the piston 24 as it reaches the end of its stroke in either direction, that is, subsequent to the closing off of the port 41' in the upward movement of the piston 24 and subsequent to the closing off of the port 41 in the downward movement of the piston, each valve means 44z, 44z', being automatically controlled in co-ordinated relation to the speed of the engine, as later set forth. Accordingly, it will be seen that the movement of the piston in its valve opening direction is progressively controlled by the valve means 44a, 44z, and the movement of the piston 24 in its valve seating direction is progressively controlled by the valve means 44x, 44z', the valve means 44z, 44z', serving to prevent hammering and vibration effects, and hence providing for the use of large valves and rapid movement thereof well adapted for a high speed motor.

The valve means 44a, 44x, are connected by pipes 64 to the ports 36, 36a, respectively, the pipes in turn being connected to a discharge pipe 64x leading to a sump (not shown). The valve means 44z, 44z', are connected by pipes 64z to the ports 62, 62x, which pipes in turn are connected to a discharge pipe 64z' leading to a sump (not shown). The valve means 44a, 44x, 44z, 44z', are operatively connected to governors 100, 100a, 100b, 100c, respectively, suitably connected to a driven element (for example, one of the shafts 48) of the engine, whereby the speed of the latter controls the adjustment of these valve means to make the latter effective in co-ordinated relation thereto.

The valve means 44a, 44x, 44z, 44z', are similar in construction and operation, so that one only thereof (valve means 44z) need be referred to as follows (see Fig. 4): As shown, the pipe 64z consists of an inner section 101 fixed at its inner end to the wall of the cylinder 22 in connected relation to the port 62 and an outer section 101a the outer end portion of which rotatably and telescopically fits within a nipple 101b provided on the adjacent pipe 64z'. The inner end portion of the section 101a is enlarged so as to fit over the outer end portion of the section 101, the latter section being provided externally with screw threads engaging internally screw threads on the section 101a, so that by rotating the latter section it may be adjusted endwise relative to the section 101. The end wall of the section 101 is ground to form a seat for a ball valve 102, whereas the annular shoulder provided by the enlarged portion of the pipe section 101a forms a seat for one end of a coiled spring 102a, which engages the ball valve at its opposite end to yieldingly maintain it in seating position. In this arrangement, it will be observed that by rotating the section 101a, the tension of the spring 102a may be increased or decreased to control the discharge of oil at varying pressures. 103 indicates a split ring removably clamped to the section and provided with a lug 103a, the lug in turn being connected by a linkage 104 to the governor 100b, so that the latter, dependent on the increase or decrease of speed of the adjacent shaft 48, may rotate the section 101a and adjust the tension of the spring 102a, whereby the relief of oil pressure from the cylinder 22 as the piston 24 reaches the end of its up stroke is controlled. It will be understood that by loosening the split ring 103, the section 101a may be manually adjusted for any predetermined engine speed, whereby variations in the latter will adjust the sections as the speed of the engine increases or decreases in relation to the initial setting of the section 101a.

Each governor may be of any desired form of construction, such as shown substantially diagrammatically in Fig. 8. In this view, 109 indicates a collar fixed to the adjacent shaft 48 and pivotally carrying diametrically related levers 110, corresponding arms of which are provided with weights, the other arms bearing on a spool 111 which is slidably keyed to the shaft 48. The movement of the spool 111 transmits power through a bell crank 112 to automatically operate the adjacent linkage 104. The movement of the spool by the levers 110 is controlled by the tension of a spring 113 seated between a collar fixed to a plunger 114 and the bottom wall of an inverted casing 115. The plunger 114 is connected to a bell crank 116, which is operated by the spool 111. The casing 115 is externally screw threaded and adjustably mounted in the bottom wall of the governor housing. The outer open end of the casing 115 is provided with a collar 117 (the collar being removable), whereby the casing can be rotated and thus increase or decrease the tension of the adjacent spring 113. The plunger 114 is slidably mounted in alined openings formed in the bottom of the casing 115 and collar 117.

It will further be noted that my construction of valve operating mechanisms is advantageous since each valve moves in either direction independently of its operating device. That is, while the eccentric for the valve operating mechanism makes one revolution for each engine cycle and it in turn operates a device (member 38) which controls the supply of liquid to the adjacent cylinder 22 the piston operates the valve in either direction independently of the device and its operating eccentric, while maintaining the opening and closing of the valve in co-ordinated relation to the engine cycle. Accordingly, the speed of movement of the valve in either direction is dependent upon the power (liquid) irrespective of the speed of the crank shaft and eccentric carrying shaft and movement of the member 38, the latter through its control of the power insuring valve operation once for each engine cycle.

This application is a continuation, in part, of my co-pending application Ser. No. 416,698, filed Oct. 27, 1941, now abandoned.

To those skilled in the art to which my invention relates many changes in construction and widely differing embodiments and applications of the invention will suggest themselves without departing from the spirit and scope of the invention. My disclosures and the description herein are purely illustrative and are not intended to be in any sense limiting.

What I claim is:

1. In valve operating means for an internal combustion engine, the combination with a cylinder, a valve therefor and a shaft adapted to be driven by the engine crank shaft, of a case formed with side-by-side parallelly related openings to provide main and auxiliary cylinders, the wall between said cylinders being formed with ports connecting the opposite ends of said main cylinder with said auxiliary cylinder and the wall of the latter cylinder being formed with exhaust openings, a piston in said main cylinder connected to the shank of said valve, a source of liquid supply under pressure having connection with said auxiliary cylinder, each connection being related to one of said ports, a member reciprocably mounted in said auxiliary cylinder and provided with ducts, certain thereof in one position of said member being arranged to connect said liquid supply with one of said ports and the other port with one of said exhaust openings and certain thereof in another position of said member being arranged to connect the other port with the liquid supply and the first mentioned port with one of the exhaust openings, exhaust conduits connected to the opposite ends of said main cylinder, valve means in said conduits actuated by said shaft for controlling the discharge of liquid from said main cylinder as the piston therein approaches the end of its movement in either direction, and means drivingly connected with said shaft for reciprocating said member.

2. An operating means as claimed in claim 1 wherein a spring operated valve is provided in each of said conduits and means actuated by said shaft are provided for regulating the tension of said springs, to control the discharge of liquid through said conduits from said main cylinder as the piston therein approaches the end of its movement in either direction.

3. In valve operating means for an internal combustion engine, the combination with a cylinder, a valve therefor and a shaft adapted to be driven by the engine crank shaft, of a case formed with side-by-side parallelly related openings to provide main and auxiliary cylinders, the wall between said cylinders being formed with ports connecting the opposite ends of said main cylinder with said auxiliary cylinder and the wall of the latter cylinder being formed with exhaust openings, a piston in said main cylinder connected to the shank of said valve, a source of liquid supply under pressure having connection with said auxiliary cylinder, each connection being related to one of said ports, a member reciprocably mounted in said auxiliary cylinder and provided with ducts, certain thereof in one position of said member being arranged to connect said liquid supply with one of said ports and the other port with one of said exhaust openings and certain thereof in another position of said member being arranged to connect the other port with the liquid supply and the first mentioned port with one of the exhaust openings, exhaust conduits connected to said exhaust openings for said auxiliary cylinder, valve means in said conduits actuated by said shaft for controlling the flow of liquid therethrough from said auxiliary cylinder, and means drivingly connected to said shaft for reciprocating said member.

4. An operating means as claimed in claim 3 wherein a spring operated valve is provided in each of said conduits and means actuated by said shaft are provided for regulating the tension of said springs, to control the flow of liquid through said conduits from said auxiliary cylinder.

EDWARD E. WALLACE.

REFERENCES CITED

The following references are of record in the file of this patent:

UNITED STATES PATENTS

| Number | Name | Date |
|---|---|---|
| Re. 15,019 | Landgraf | Jan. 4, 1921 |
| 885,459 | Engler et al. | Apr. 21, 1908 |
| 908,641 | Barthel | Jan. 5, 1909 |
| 1,007,040 | Mead | Oct. 24, 1911 |
| 1,094,329 | Henderson | Apr. 21, 1914 |
| 1,138,908 | Tibbetts | May 11, 1915 |
| 1,282,571 | Guy | Oct. 22, 1918 |
| 1,416,348 | Guy | May 16, 1922 |
| 1,456,004 | Gunther | May 22, 1923 |
| 1,539,041 | Crawford | May 26, 1925 |
| 1,639,333 | Ford | Aug. 16, 1927 |
| 1,746,227 | Almen | Feb. 4, 1930 |
| 1,889,583 | Woolson | Nov. 29, 1932 |
| 2,066,394 | Daub | Jan. 5, 1937 |